May 7, 1946. G. A. TINNERMAN 2,399,957
FASTENING DEVICE
Filed June 26, 1942
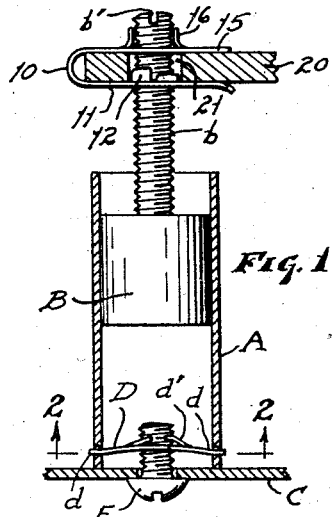
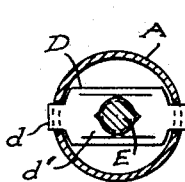
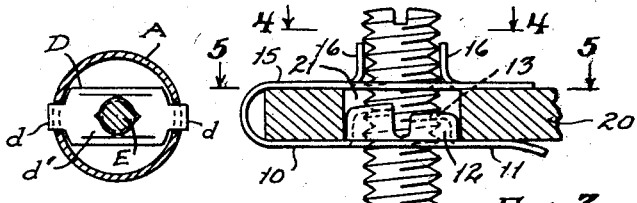
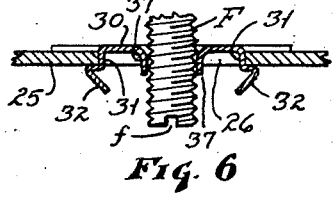
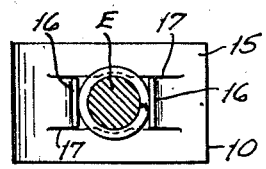
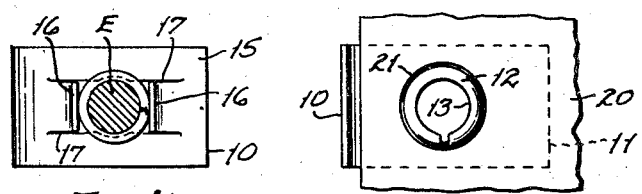
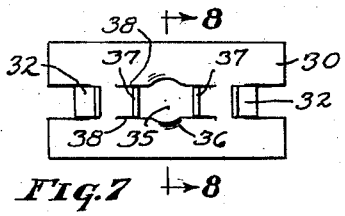
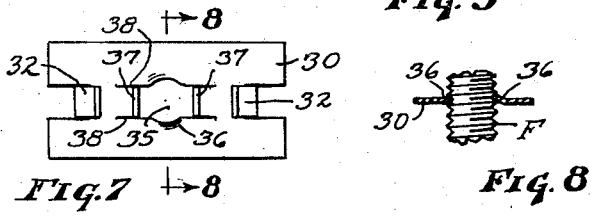
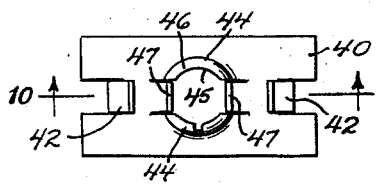
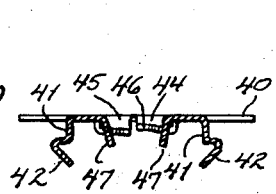
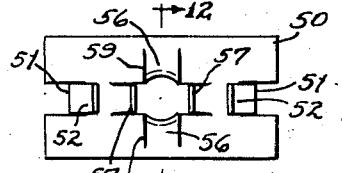
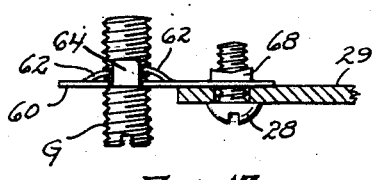
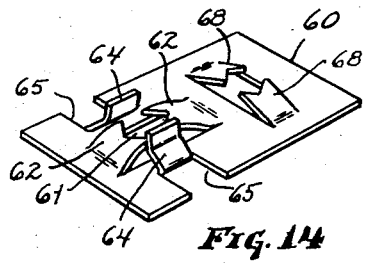
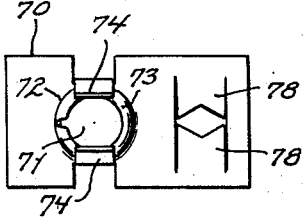
Inventor
George A. Tinnerman,
By Bates, Teare & McBean, Attorneys.

Patented May 7, 1946

2,399,957

UNITED STATES PATENT OFFICE 2,399,957

FASTENING DEVICE

George A. Tinnerman, Cleveland, Ohio, assignor to Tinnerman Products, Inc., Cleveland, Ohio, a corporation of Ohio Application June 26, 1942, Serial No. 448,592

7 Claims. (Cl. 85—36)

This application is a continuation in part of my copending application No. 340,203, filed June 12, 1940, now Patent No. 2,326,903, issued August 17, 1943.

This invention relates to a fastening device for screw threaded shafts for use where it is desired to effect a helical engagement in a thread groove as a nut and also to maintain a frictional engagement with the crests of the thread. The invention is especially useful in connection with various instruments having screw-threaded adjustments, for instance, tuning or similar devices in radio apparatus. Such instruments frequently include a coil form or the like and an adjusting screw providing for axial adjustment of the tuning core within the coil form.

My invention provides in a very simple manner for maintaining a frictional engagement with the crests of the threaded adjusting screw, preventing its jarring loose, where the screw carries an electric current, my frictional clamp is of further advantage in preventing leakage or irregularities from movement of the screw in the nut. My invention is particularly useful in radio apparatus mounted on automobiles or other locations where it is subjected to constant vibration, tending to disturb the adjustment and interfere with the reception.

To the above ends, I have provided a simple device which furnishes at once a nut by means of warped edges engaging in the groove of the thread and spring tongues projecting from the same device, but positioned so as not to interfere with the nut members, extending parallel with the axis of the screw and engaging crests of its threads to maintain a friction tight engagement therewith.

Several different embodiments of my invention are illustrated in the drawing hereof and are hereinafter explained in detail, and the essential novel features common to all of the embodiments, and also features individual of the different embodiments are set out in the claims.

In the drawing, Fig. 1 is a sectional elevation of an instrument mounting embodying one form of my fastening device; Fig. 2 is a section taken on the line 2—2 on Fig. 1; Fig. 3 is an enlarged view of the mounting for the adjusting screw shown in Fig. 1; Fig. 4 is a sectional plan of the mounted fastener shown in Fig. 3; Fig. 5 is a sectional plan showing the lower arm of the fastener of Fig. 3 in position, the plane of the section being just below the upper arm, as indicated by the line 5—5 on Fig. 3.

Fig. 6 is a vertical section through a modified form of thread engaging device; Fig. 7 is a bottom plan of the construction of Fig. 6; Fig. 8 is a cross section of the line 8—8 on Fig. 7.

Fig. 9 is a bottom plan of a further modification of the fastener; Fig. 10 is a sectional view thereof, as indicated by the line 10—10 in Fig. 9.

Fig. 11 is a bottom plan of a further modification of the fastener; Fig. 12 is a cross section on the line 12—12 in Fig. 11.

Fig. 13 is an elevation of another form of my fastener, embodying combined thread engaging means and tensioning tongues with separate means for an attaching screw; Fig. 14 is a plan with the fastener of Fig. 13.

Fig. 15 is a plan of a modified form of fastener having provision for a separate attaching screw.

Referring first to the embodiment of Figs. 1 to 5 inclusive, A in Fig. 1 illustrates a coil form or other instrument in the form of a cylinder housing a tuning core B which has an axially extending threaded operating shaft $b$. The cylinder A is held on a suitable support C in any suitable manner.

I have shown the instrument anchored to the support by means of a bridge piece D having reduced ends $d$ occupying openings in the cylinder and having a screw-receiving central opening with oblique tongues $d'$ on the opposite sides thereof. These tongues are cut from the body of the strip and bent upwardly and notched and warped at their edges, so as to be able to engage a screw thread, and act as a nut therefor. Such a screw is indicated at E in Fig. 1 and by screwing upwardly through the support C into the bridge piece, it locks the cylinder to the support in a very simple manner, as clearly indicated in Figs. 1 and 2.

The screw shaft $b$ of Fig. 1 is shown as having a screw driver slot $b'$ in its upper end. Accordingly, by providing a supporting nut for it the core B may be readily moved axially in the cylinder. However, support by an ordinary nut is not satisfactory, where an accurate adjustment should be maintained, especially if the instrument is liable to receive vibration. My device, about to be described, and as hereinbefore outlined, not only provides the nut but also frictional engagement for maintaining a tight connection.

As shown in Figs. 1 and 3, 10 indicates my combined nut and frictional engager, shown as a strip doubled into a U-shape and snugly embracing a supporting arm 20. Each arm of the U has an opening for the passage of the threaded shank b. One of the arms, preferably the lower arm 11, is equipped with warped surfaces about the opening to engage within the thread groove and act as a nut. As shown, this warped surface comprises an upstanding inwardly flanged nearly annular portion 12, the edge 13 of which forms a nearly complete helical turn, as shown, especially in Figs. 3 and 5.

On opposite sides of the opening through the upper arm 15, I provide a pair of parallel flat tongues 16 which are formed from the body of this arm by parallel slits 17. These tongues lie on diametrically opposite sides of the screw threaded shaft and extend nearly at right angles to the arm but normally converge slightly so as to form a friction-tight engagement with the crests of the threads, as shown particularly in Figs. 1, 3 and 4.

The combined nut and frictional retainer above described, may be mounted on the supporting plate 20 simple by spreading the arms of the fastener apart, shoving it over the edge of the support until the upstanding helical portion 12 extends into the opening 21 made in the support for this purpose. This effectively positions the fastening device on the support and provides at once the nut and the spring acting friction engagers to press against the crests of the threaded shaft.

By the means described, I not only support the threaded shaft by a nut but at the same time I provide sufficient friction so that the shaft will not become displaced from the jarring but will maintain its position until it is intentionally changed by being rotated. The friction tongues 16 hold the shaft against any inadvertent displacement. They may also be availed of whenever desired for maintaining a tight electric connection between the supporting member 20 and the shaft. This is of special value in some types of radio apparatus.

In Figs. 6, 7 and 8, I have illustrated another embodiment of my invention. In these views, F indicates a suitable screw, shown as having a screw driver slot f at its lower end, and 30 indicates a fastening clamping device, mounted in a supporting plate 25 and adapted to hold the screw in position.

The fastening device, as here shown, comprises a flat plate 30 adapted to rest on top of the support 25 and having lugs 31 made by notches in the end of the plate and turned downwardly, first at right angles and then substantially parallel with the plate and then by a rounded bend passing downwardly in an inclined direction, as shown at 32 in Fig. 6. These lugs are adapted to be passed through an opening 26 in the support and the bends thereof form humps which by engaging the underside of the support, while the body of the fastener engages the upper side, will effectively lock the fastener to the support.

This fastener is formed with a central opening 35 for the passage of the screw and on opposite sides of this opening the material of the fastener is tipped up and warped, as indicated at 36 to act as a nut. On two other diametric sides of the opening 35 the fastener is provided with a pair of down-turned tongues 37 cut out of the body of the fastener by means of parallel slits 38, these two tongues extending approximately at right angles to the base of the fastener but converging slightly so as to maintain a frictional engagement with the crests of the screw thread.

It will be seen that the embodiment of Figs. 6, 7 and 8, like that previously described, provides, by a single sheet metal fastening device, a helically edged nut adapted to engage in the thread groove and also provides diametrically positioned tongues to bear on the crests of the thread and maintain good friction contact therewith.

The embodiment of Figs. 9 and 10 is very similar to that of Figs. 6, 7 and 8. The body plate 40 of the fastener, the downward lugs 41 bent outwardly and inclined at 42, and the downward tongues 47 at diametrically opposite positions about the opening 45 to engage the crown of the screw thread, are the same as the corresponding parts shown in Figs. 6 and 7 and heretofore described. The nut portion of the fastener is somewhat different from that of Figs. 6, 7 and 8, in that there are arcuate flanges 44 extending downwardly about the opening 45 and then bent inwardly and warped to provide an interrupted helix 46 to occupy the thread groove.

The construction of Figs. 11 and 12 is also similar to Figs. 6, 7 and 8, insofar as the body of the fastener 50 and the downward lugs 51, with their locking edges 52, are concerned. This embodiment of Figs. 11 and 12 also has two diametrically opposed flat tongues 57 to engage the crests of the thread. The part of this fastener engaging the thread groove, however, is specifically different in that it comprises two transversely aligned tongues 56 formed by transverse slits 59, the ends of the tongues being concaved and the tongues being tipped upwardly as shown in Fig. 12 and warped according to a helical turn of the bolt.

In Figs. 13 and 14, I have illustrated an embodiment providing on one fastening plate the thread engaging members and the tongues to frictionally bear against the crests of the thread and also a separate nut portion for attachment to a support. That is to say, the fastener 60 of this embodiment has a bolt receiving opening 61 on opposite sides of which are tongues 62 cut from the body and bent upwardly in an inclined direction with V-shaped warped ends to engage in the helical thread of the bolt.

The fastener being described has also transverse tongues 64 formed by external opposed notches 65 in the plate, these tongues 64 being bent upwardly to present two converging nearly parallel opposed portions engaging the crest of the thread of the screw G in diametrically opposite regions, while the tongues 62 seat in the threads of such bolt in diametrically opposite regions at right angles to the friction engaging tongues 64.

The plate 60 is formed into a nut to engage an attaching screw 28, which may secure the fastener to a supporting plate 29. The nut formation for this purpose comprises, preferably, two opposed tongues 68 provided by a pair of parallel slits, and an opening between them, the tongues bent up and their edges notches and warped to bound a helical turn.

The fastener 70 of Fig. 15 is very similar to the fastener of Figs. 13 and 14. It has the same arrangement of tongues 78 whereby it may be secured by a screw to a support. It also has the same arrangement of friction engaging tongues 74 to lie against the crests of the threaded bolt. The thread engaging portion in this embodiment differs from that of Figs. 13 and 14 in that in Fig. 15 I have provided a nearly annular wall 72 about the bolt opening 71, this wall at its edge being flanged inwardly in a helical form, as indicated at 73, to engage in the thread groove of a bolt the crests of which are engaged by the tongues 74.

It will be seen that, though I have illustrated six embodiments of the invention, they all have the common feature of a passageway for a threaded bolt and two sets of engaging devices coacting with such bolt, one set occupying the thread groove of the bolt to act as a nut and the other set engaging crests of the bolt thread to frictionally hold the bolt against displacement in the nut. Likewise, each of these embodiments may be made from a single strip of spring sheet metal simply by cutting and bending operations.

Reference is made to my divisional application No. 522,558, filed February 16, 1944, for claims particularly directed to the structure of Figs. 1 to 5 inclusive, and to my divisional application No. 522,755, filed February 17, 1944, for claims directed particularly to the structure illustrated in Figs. 13, 14 and 15.

I claim:

1. A fastener comprising a plate having an opening through it for the passage of a threaded shaft, a pair of diametrically opposed tongues at the opposite sides of the opening bent therefrom at approximately right angles to the plane of the plate to engage crests of a threaded shaft passing through the opening, and distorted edges of the plate opposed to each other on opposite sides of the opening substantially a quarter turn from the tongues first-mentioned, said distorted edges being adapted to seat in the groove of the same threaded shaft.

2. A fastener comprising a substantially flat plate of spring metal having an opening through it, a pair of tongues cut from the metal on opposite sides of the opening and turned at approximately right angles thereto to provide parallel tongues adapted to engage the crests of a threaded shaft on opposite sides thereof, and helical distortions formed on the metal from two regions substantially midway between the two tongues to engage the thread groove.

3. A fastener comprising a plate having a pair of spring lugs adapted to effect a snap-fastening engagement with a support, an opening through the fastener and a pair of spring tongues on opposite sides of the opening turned away from the plane of the fastener adapted to engage the crest of a threaded shaft passing through the opening and other means carried by the fastener adapted to engage in the thread groove of said shaft.

4. A fastener comprising a substantially flat plate having a pair of notches therein, lugs integrally formed by the fastener and provided by such notches and bent from the plane of the plate and adapted to pass through an opening in a support while the body of the plate engages the support, said plate having an opening through it, helical thread-engaging means distorted from the plate on opposite sides of the opening, and a pair of tongues bent from the plate to engage crests of the thread in other regions of the bolt.

5. A fastener comprising a plate of spring sheet metal having an opening through it, a pair of tongues bent from the plate in diametrically opposed regions about the opening and projecting at approximately right angles to the plate, the edges of the plate on the other two sides of the opening substantially a quarter distance around the opening from the said tongues being formed into thread engaging members, said plate being provided with a pair of lugs cut from the plate and extending at an angle thereto and formed with humps so that they may have a snap-fastening engagement with the edges of an opening in a support.

6. A sheet metal fastener formed for the passage of a threaded shaft, said fastener having an opening and having a portion distorted in spaced regions about the opening to form thread-engagers to occupy the thread groove of the shaft passing through the opening, said fastener having also a plurality of tongues equally disposed about an axis and alternating circumferentially with the thread-engager and having their free ends axially spaced from said thread-engagers, said tongues frictionally pressing at their ends against the thread and operating to increase the resistance to the turning of the shaft.

7. A fastener comprising a single sheet of spring material with a bolt receiving opening through it, a plurality of tongues bent in the same general direction from the sheet at the edge of the opening and adapted to press in counter-balancing relation against the crests of a threaded bolt passing transversely of the sheet through the opening, and distorted edges of the sheet about the opening and positioned so as not to interfere with the tongues, said distorted edges being adapted to occupy the thread groove of the same bolt.

GEORGE A. TINNERMAN.